United States Patent [19]

Sakamoto et al.

[11] Patent Number: 5,133,806
[45] Date of Patent: Jul. 28, 1992

[54] SOFTY MUD SOLIDIFYING AGENT

[75] Inventors: Hiroyuki Sakamoto; Masao Sagara; Masao Shimoda; Kitsugi Kyoichi, all of Tokyo, Japan

[73] Assignees: Fujita Corporation; Onoda Chemico Co., Ltd., both of Tokyo, Japan

[21] Appl. No.: 815,919

[22] Filed: Jan. 6, 1992

Related U.S. Application Data

[63] Continuation of Ser. No. 636,430, Dec. 31, 1990, abandoned.

[30] Foreign Application Priority Data

Jun. 5, 1990 [JP] Japan ................................ 2-145366

[51] Int. Cl.⁵ ................................................ C04B 7/13
[52] U.S. Cl. ...................................... 106/811; 106/694; 106/695; 106/696; 106/708; 106/709; 106/714; 106/715; 106/718; 106/719; 106/721; 106/722; 106/724; 106/725; 106/732; 106/789; 106/790; 106/791; 106/819; 106/823; 106/DIG. 1
[58] Field of Search ............... 106/705, 708, 709, 714, 106/715, 718, 719, 721, 722, 724, 725, 732, 811, 819, 823, DIG. 1, 789, 790, 791, 692, 694, 695, 696

[56] References Cited

U.S. PATENT DOCUMENTS

| | | | |
|---|---|---|---|
| 3,215,549 | 11/1965 | Ericson | 106/811 |
| 3,565,648 | 2/1971 | Mori et al. | 106/715 |
| 4,019,918 | 4/1977 | Wills, Jr. | 106/732 |
| 4,036,659 | 7/1977 | Stude | 106/732 |
| 4,299,516 | 11/1981 | Miyashi et al. | 106/715 |
| 4,306,910 | 12/1981 | Miyoshi et al. | 106/715 |
| 4,328,039 | 4/1982 | Masuda | 106/715 |
| 4,367,986 | 1/1983 | Miyoshi et al. | 106/715 |
| 4,443,260 | 4/1984 | Miyoshi et al. | 106/715 |
| 4,451,295 | 5/1984 | Sprouse | 106/715 |
| 4,472,201 | 9/1984 | Ochi et al. | 106/708 |
| 4,539,121 | 9/1985 | Kapland et al. | 106/811 |
| 4,615,809 | 10/1986 | King | 106/708 |
| 4,861,378 | 8/1989 | Watanabe ewt al. | 106/774 |
| 4,875,937 | 10/1989 | Viles | 106/791 |
| 4,892,586 | 1/1990 | Watanabe et al. | 106/732 |
| 4,909,849 | 3/1990 | Funderburk | 106/708 |

Primary Examiner—Karl Group
Assistant Examiner—Anthony J. Green
Attorney, Agent, or Firm—Wenderoth, Lind & Ponack

[57] ABSTRACT

There is disclosed a softy mud solidifying agent which comprises cement, and at least two members selected from the group consisting of pozzolanic substances, inorganic compounds and organic compounds. The solidifying agent is capable of solidifying dredged earth, sand, softy mud, etc. in such a manner that their mixture can be re-cast into water to form submerged banks, artificial fish-gathering places, etc., without causing water pollution.

2 Claims, No Drawings

SOFTY MUD SOLIDIFYING AGENT

This application is a Rule 62 continuation of now abandoned application, Ser. No. 07/636,430, filed Dec. 31, 1990 now abandoned.

BACKGROUND OF THE INVENTION

1. Field of the Invention

The present invention relates to a softy mud solidifying agent capable of solidifying dredged softy mud in such a manner it can be utilized through re-casting into water. 2. Description of the Prior Art In an attempt to solidify the bed of seas, lakes, rivers or the like, and softy mud accumulated thereon, earth, sand, softy mud, etc. are dredged into a ship or onto land and admixed with a solidifying agent, and the resulting mixture is re-cast on the bed of the sea, a lake, a river or the like, so as to form a solidified ground or bank.

However, no prior softy mud solidifying agent is resistant to separation and capable of improving the fluidity of softy mud. Accordingly, when earth, sand, softy mud, etc. admixed with a prior solidifying agent are re-cast into water, particles of earth, sand solidifying agent, etc. immediately disperse into the water, thereby causing water pollution and inefficient solidification of the softy mud.

DESCRIPTION OF THE INVENTION

It is therefore an object of the present invention to provide a softy mud solidifying agent which is free from water pollution and, at the same time, is capable of solidifying a dredged softy mud up to a prescribed strength when it is re-cast into water after being admixed with dredged earth, sand, soft mud, etc.

According to the present invention, there is provided a softy mud solidifying agent which comprises cement as the principal component, and at least two members selected from the group consisting of pozzolanic substances, inorganic compounds and organic compounds.

Pozzolanic substances incorporated in the solidifying agent according to the invention improve the strength and the long-term stability of the solidified earth, sand, softy mud, etc., and inorganic and organic compounds impart stability, fluidity, separation resistance, etc. to the mixture. Accordingly, when dredged earth, sand, softy mud, etc. are admixed with the solidifying agent and re-cast on the bed of sea, lake, river, or the like, the mixture accumulates thereon and solidifies in situ without causing water pollution resulting from the dispersion of particles of earth, sand, softy mud solidifying agent, etc.

EXAMPLES

The softy mud solidifying agent according to the invention will further be illustrated by way of examples.

Examples of cements usable in the invention include ordinary, high-early-strength and moderate-heat Portland cements; mixed cements, such as blast furnace cement, silica cement and fly-ash cement; special purpose cements, such as alumina cement, ultra early-strength cement, colloid cement and ultra fine particle cement; and mixtures of these.

Examples of pozzolanic substances usable in the invention include artificial pozzolans, such as blast furnace water granulated slag, converter slag, electric furnace slag, silica fume and fly ash; and naturally occurring pozzolans, such as loam, Shirasu (white volcanic ash), tuff, and the like.

Examples of inorganic compounds usable in the invention include limes, calcined dolomite, gypsum, calcium salts, sulfates, bentonite, iron oxides, and the like.

Examples of organic compounds usable in the invention include celluloses (e.g., hydroxypropyl methyl cellulose, hydroxyethyl methyl cellulose, hydroxyethyl cellulose, etc.), acryls (e.g., partially hydrolyzed products of polyacrylamides, acrylamide-acrylate copolymers, etc.), polyalkylsulfonates, ligninsulfonates, melamine-formalin resin sulfonates, polyoxyethylene oxides, melamine resins, phenol resins, polyacrylates, and the like.

The solidifying agent may have the following composition:

| | |
|---|---|
| Cement | 50 to 95% by weight |
| Pozzolanic substances<br>Inorganic compounds<br>Organic compounds | } 50 to 5 wt % |

The composition of the solidifying agent can be decided by taking into consideration the characteristics of the softy mud to be treated, strength of earth to be treated, the fluidity thereof, and the like.

The quantity of the solidifying agent to be admixed with earth, sand, softy mud, etc. may be varied, depending on the desired strength. In usual cases, it is from 1 to 25% by weight, preferably from 4 to 6% by weight, based on the weight of earth, sand, softy mud, etc. to be solidified.

In one experiment, 500 m3 of softy mud accumulated on the seabed (water content, 300%, wet density, 1.2 g/cm$^3$; and ignition loss, 8%) was dredged and admixed on land with a solidifying agent according to the present invention, and the resulting mixture was cast on the seabed to form a submerged bank.

The composition of the solidifying agent used in the above experiment was as follows: Ordinary Portland cement, 50 wt %; blast furnace water ground slag, 40 wt %; anhydrous gypsum, 4.5 wt %; slaked lime, 4 wt %; hydroxy methyl cellulose, 0.2 wt %; polyacrylates 0.2 wt %; and calcium chloride, 1 wt %.

The solidifying agent was used in an amount of 5% by weight, based on the weight of the softy mud.

In this test, the mixing of the solidifying agent was effected by admixing powders of the solidifying agent with the dredged softy mud. After being admixed for 5 minutes, the mixture was returned to the seabed of two meters deep to form a submerged bank, thereby using a tremie pipe. There occurred no pollution of water at the time when the submerged bank was constructed, and the pH of seawater around the bank remained unchanged at 7.6 before and during the construction.

MERITS OF THE INVENTION

The solidifying agent according to the invention exhibits excellent solidifying function, does not separate after being admixed with softy mud, and is capable of improving the fluidity of softy mud. Accordingly, after the solidifying agent is admixed with dredged earth, sand, softy mud, etc. on land or in a ship, the resulting mixture can be re-cast, accumulated and solidified on the bed of sea, lake, river, and the like. The solidifying agent therefore makes it possible to utilize dredged softy mud by re-casting into in water. This can be highly advantageous since it is becoming increasingly difficult to secure landfills or places at which dredged softy mud can be disposed off.

In addition, submerged structures constructed by using softy mud so solidified can be free from dissolving of organic pollutants and other harmful substances into water.

Furthermore, the solidifying agent of the invention enables to construct submerged banks, artificial gathering places for fish, or the like, thus making it possible to effectively utilize dredged softy mud in large quantities. It is also possible to culture seaweed on the banks and artificial gathering places.

What is claimed is:

1. A softy mud solidifier comprising:
   (a) cement as the principal component,
   (b) an inorganic compound, and
   (c) a mixture of a pozzolanic substance and an organic compound,
   said inorganic compound being one or more members selected from the group consisting of
   (i) lime and gypsum,
   (ii) calcined dolomite,
   (iii) calcium salts,
   (iv) sulfates, and
   (v) iron oxides,
   said organic compound being one or more members selected from the group consisting of
   (i) acryls,
   (ii) polyalkylsulfonates,
   (iii) melamine-formalin resins,
   (iv) polyoxyethylene oxides,
   (v) melamine resins,
   (vi) phenol resins, and
   (vii) polyacrylates, and
   wherein the cement is present in an amount of 50-95% by weight, and components (b) and (c) are each present in amounts effective to solidify soft mud treated therewith, said components (b) and (c) being present in a combined amount of 5-50% by weight.

2. A softy mud solidifier consisting essentially of 50 wt. % Portland Cement, 40 wt. % of blast furnace water ground slag, 4.5 wt. % anhydrous gypsum, 4.0 wt. % slaked lime, 0.2 wt. % hydroxy methyl cellulose, 0.2 wt. % polyacylates, and 1 wt. % calcium chloride.

* * * * *